US009298745B2

(12) United States Patent
Lee et al.

(10) Patent No.: US 9,298,745 B2
(45) Date of Patent: Mar. 29, 2016

(54) MOBILE TERMINAL CAPABLE OF DISPLAYING OBJECTS CORRESPONDING TO 3D IMAGES DIFFERENTLY FROM OBJECTS CORRESPONDING TO 2D IMAGES AND OPERATION CONTROL METHOD THEREOF

(75) Inventors: Shinhae Lee, Seoul (KR); Taeyun Kim, Seoul (KR); Seunghyun Woo, Seoul (KR); Dongok Kim, Seoul (KR); Jonghwan Kim, Seoul (KR); Hayang Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 685 days.

(21) Appl. No.: 13/198,465

(22) Filed: Aug. 4, 2011

(65) Prior Publication Data
US 2012/0139904 A1    Jun. 7, 2012

(30) Foreign Application Priority Data

Dec. 1, 2010    (KR) ......................... 10-2010-0121406

(51) Int. Cl.
*G06F 3/048* (2013.01)
*G06F 17/30* (2006.01)
*G06F 3/0481* (2013.01)
*G06F 3/0488* (2013.01)

(52) U.S. Cl.
CPC ...... *G06F 17/30274* (2013.01); *G06F 3/04817* (2013.01); *G06F 3/04883* (2013.01)

(58) Field of Classification Search
CPC ..... G03G 15/502; G06F 3/1242; G06F 3/017; G06F 3/0487; G06F 3/0482; H04N 13/0292; H04N 1/00411; H04N 1/00442; H04N 1/00456; G02B 27/225
USPC .......................................................... 715/848
See application file for complete search history.

(56) References Cited

U.S. PATENT DOCUMENTS

2004/0070673 A1 *  4/2004  Nakamura ................. 348/207.2
2005/0154997 A1    7/2005  Brun-Cottan et al.
2006/0238519 A1 * 10/2006  Westerman et al. .......... 345/173

FOREIGN PATENT DOCUMENTS

EP    1 148 412    10/2001
EP    1 873 702    1/2008

OTHER PUBLICATIONS

Plumley, "10 Minute Guide to Windows 95®, Second Edition", Lesson 11, 1997.*
European Search Report dated Mar. 27, 2012 for Application 11009439.8.
Adobe Photoshop Lightroom, User Guide for Window and Mac OS, 2007, Adobe Systems Incorporated, San Jose, California, 95110, XP002670819, entire document.

* cited by examiner

*Primary Examiner* — Jennifer To
*Assistant Examiner* — Joseph R Burwell
(74) *Attorney, Agent, or Firm* — KED & Associates LLP

(57) ABSTRACT

A mobile terminal and an operation control method thereof are provided. The operation control method includes displaying a display screen including a first group of objects corresponding stereoscopic three-dimensional (3D) images and a second group of objects corresponding two-dimensional (2D) images on a display module; receiving a 3D indication input for distinguishing the first group of objects from the second group of objects; and displaying the first group of objects differently from the second group of objects in response to the received 3D indication input so that the first group of objects can be distinguished from the second group of objects. Since the objects corresponding to stereoscopic 3D images are displayed differently from the objects corresponding to 2D images, it is possible for a user to instantly determine whether an image corresponding to a given object is a stereoscopic 3D image or a 2D image.

21 Claims, 11 Drawing Sheets

MOBILE TERMINAL CAPABLE OF DISPLAYING OBJECTS CORRESPONDING TO 3D IMAGES DIFFERENTLY FROM OBJECTS CORRESPONDING TO 2D IMAGES AND OPERATION CONTROL METHOD THEREOF

CROSS-REFERENCE TO RELATED APPLICATION(S)

This application claims priority under 35 U.S.C. §119 to Korean Application No. 10-2010-0121406, filed on Dec. 1, 2010, the subject matter of which is incorporated herein by reference.

BACKGROUND

1. Field

The present invention relates to a mobile terminal capable of displaying objects corresponding to stereoscopic three-dimensional (3D) images differently from objects corresponding to two-dimensional (2D) images so that the objects corresponding to stereoscopic 3D images can be easily distinguished from the objects corresponding to 2D images and an operation control method of the mobile terminal.

2. Background

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless Internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals has steadily grown due to a growing tendency of considering mobile terminals as personal items that can represent personal individuality.

In the meantime, stereoscopic three-dimensional (3D) imaging, which is a technique of combining multiple images captured by a camera to create a stereoscopic 3D image, have recently become commonplace. When applied to mobile terminals, stereoscopic 3D imaging can allow the users to create stereoscopic 3D images using the cameras of the mobile terminals and to display various stereoscopic 3D images on the displays of the mobile terminals. Stereoscopic 3D images can be displayed on the displays of mobile terminals using various methods such as auto-stereoscopy, which is also called glasses-free 3D.

Conventionally, objects (such as thumbnails or icons) corresponding to stereoscopic 3D images are displayed in the same manner as objects corresponding to two-dimensional (2D) images. Thus, users may not be able to determine whether an image corresponding to a given object is a stereoscopic 3D image or a 2D image.

Therefore, a method is needed to help users distinguish objects corresponding to stereoscopic 3D images from objects corresponding to 2D images.

BRIEF DESCRIPTION OF THE DRAWINGS

Arrangements and embodiments may be described in detail with reference to the following drawings in which like reference numerals refer to like elements and wherein.

DETAILED DESCRIPTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), a navigation device, a tablet computer, or an electronic book (e-book) reader. In this disclosure, the terms 'module' and 'unit' can be used interchangeably.

Figure 1:
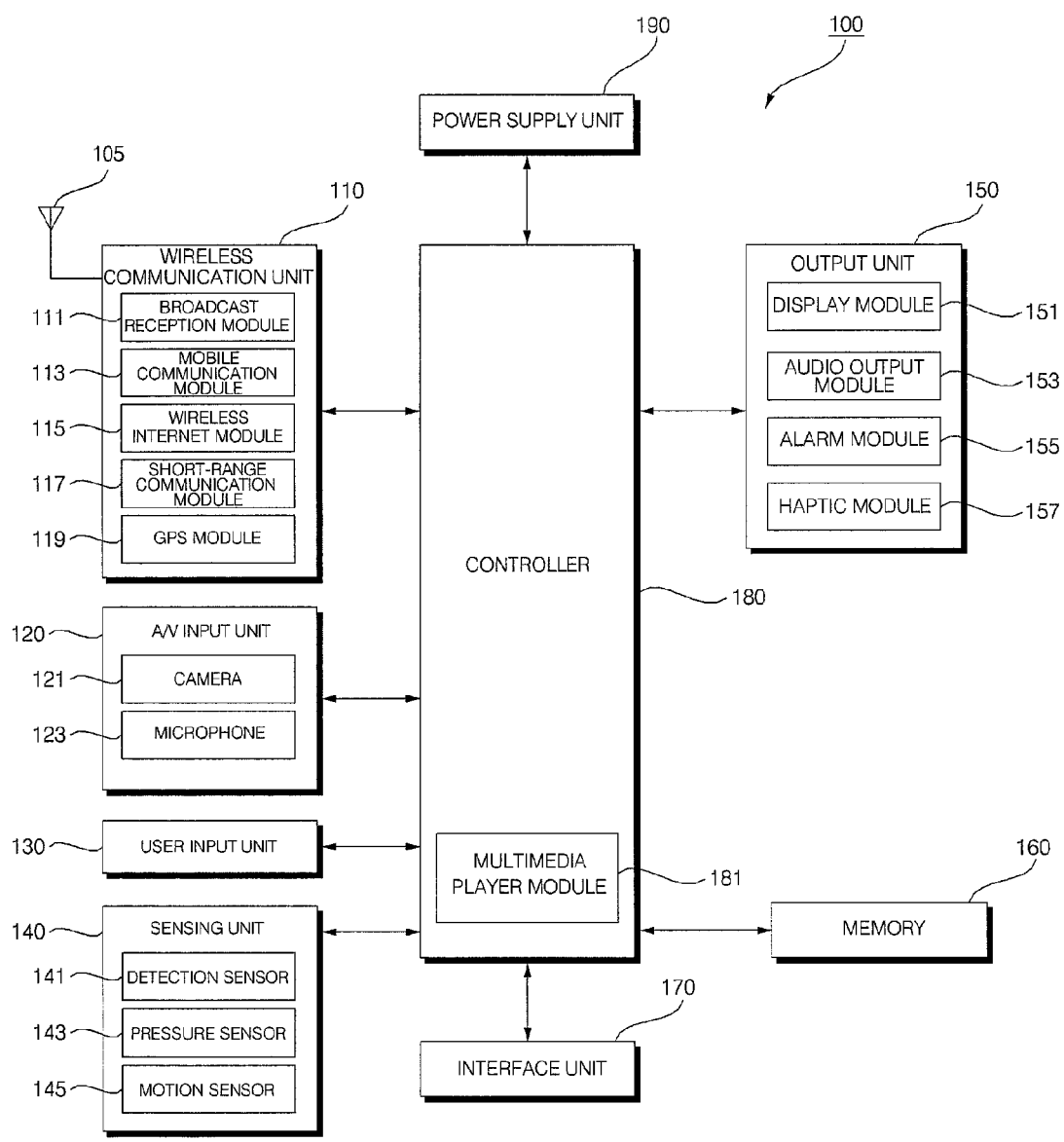
FIG. 1 is a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the Internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, or a static pressure or capacitive touch pad which is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, if the user input unit 130 is implemented as a touch pad and forms a mutual layer structure with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a detection sensor 141, a pressure sensor 143 and a motion sensor 145. The detection sensor 141 may determine whether there is an object nearby and approaching the mobile terminal 100 without any mechanical contact with the entity. More specifically, the detection sensor 141 may detect an object that is nearby and approaching by detecting a change in an alternating magnetic field or the rate of change of static capacitance. The sensing unit 140 may include two or more detection sensors 141.

The pressure sensor 143 may determine whether pressure is being applied to the mobile terminal 100 or may measure the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior structure of the mobile terminal 100 will hereinafter be described in detail with reference to FIGS. 2 and 3. The present invention can be applied to nearly all types of mobile terminals such as a folder-type, a bar-type, a swing-type and a slider-type mobile terminal. However, for convenience, it is assumed that the mobile terminal 100 is a bar-type mobile terminal equipped with a full touch screen.

Figure 2:
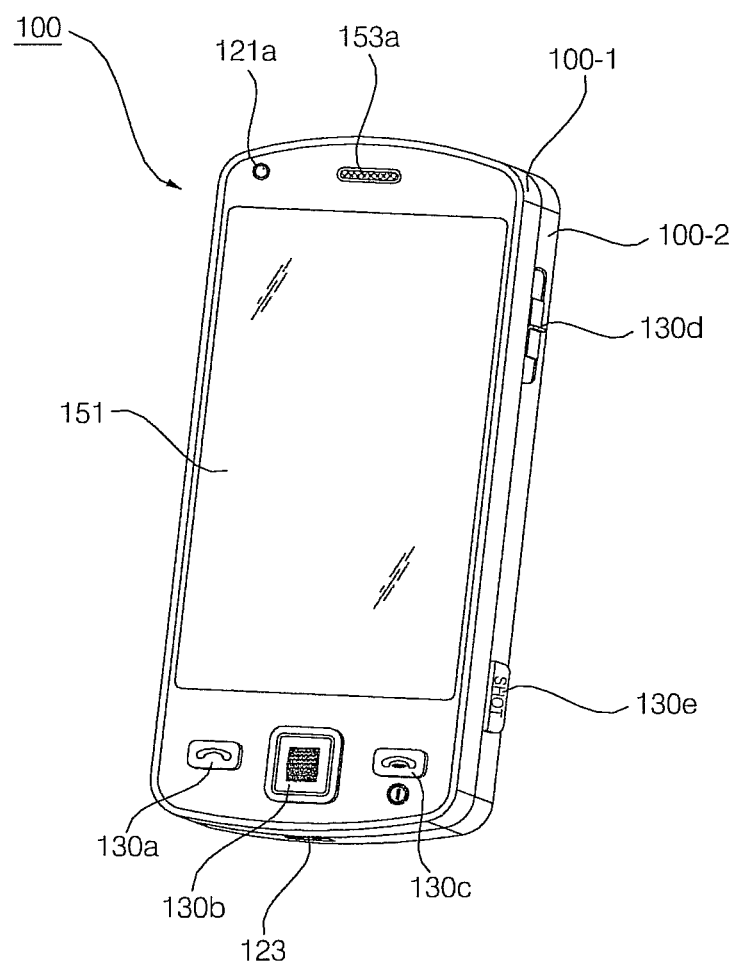
FIG. 2 is a front perspective view of the mobile terminal shown in FIG. 1.
Figure 3:
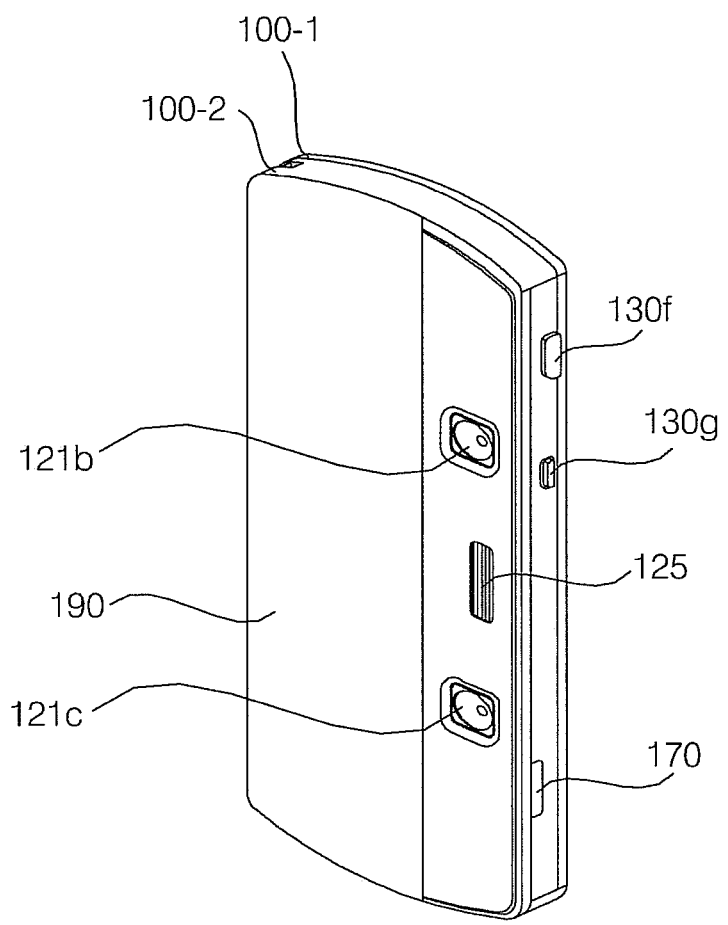
FIG. 3 is a rear perspective view of the mobile terminal shown in FIG. 2.

FIG. 2 illustrates a front perspective view of the mobile terminal 100, and FIG. 3 illustrates a rear perspective view of the mobile terminal 100. Referring to FIG. 2, the exterior of the mobile terminal 100 may be formed by a front case 100-1 and a rear case 100-2. Various electronic devices may be installed in the space formed by the front case 100-1 and the rear case 100-2. The front case 100-1 and the rear case 100-2 may be formed of a synthetic resin through injection molding. Alternatively, the front case 100-1 and the rear case 100-2 may be formed of a metal such as stainless steel (STS) or titanium (Ti).

The display module 151, a first audio output module 153a, a first camera 121a, and first through third user input modules 130a through 130c may be disposed in the main body of the mobile terminal 100, and particularly, on the front case 100-1. Fourth and fifth user input modules 130d and 130e and the microphone 123 may be disposed on one side of the rear case 100-2.

If a touch pad is configured to overlap the display module 151 and thus to form a mutual layer structure, the display module 151 may serve as a touch screen. Thus, the user can enter various information to the mobile terminal 100 simply by touching the display module 151.

The first audio output module 153a may be implemented as a receiver or a speaker. The first camera 121a may be configured to be suitable for capturing a still or moving image of the user. The microphone 123 may be configured to properly receive the user's voice or other sounds.

The first through fifth user input modules 130a through 130e and sixth and seventh user input modules 130f and 130g may be collectively referred to as the user input unit 130, and any means can be employed as the first through seventh user input modules 130a through 130f so long as it can operate in a tactile manner. For example, the user input unit 130 may be implemented as a dome switch or a touch pad that can receive a command or information according to a pressing or a touch operation by the user, or may be implemented as a wheel or jog type for rotating a key or as a joystick. In terms of function, the first through third user input modules 130a through 130c may operate as function keys for entering a command such as start, end, or scroll, the fourth user input module 130d may operate as a function key for selecting an operating mode for the mobile terminal 100, and the fifth user input module 130e may operate as a hot key for activating a special function within the mobile terminal 100.

Referring to FIG. 3, two cameras, i.e., second and third cameras 121b and 121c, may be additionally provided at the rear of the rear case 100-2, and the sixth and seventh user input modules 130f and 130g and the interface unit 170 may be disposed on one side of the rear case 100-2.

The second and third cameras 121b and 121c may have an image capture direction which is substantially the opposite to that of the first camera 121a, and may have a different resolution from that of the first camera 121a. The second and third cameras 121b and 121c may be used together to create a stereoscopic 3D image in a 3D capture mode or may be used separately to create a two-dimensional (2D) image. The distance between the second and third cameras 121b and 121c may be configured to be adjustable. Thus, by adjusting the distance between the second and third cameras 121b and 121c, it is possible to adjust the size or resolution of a stereoscopic 3D image. More specifically, one of the second and third cameras 121b and 121c may be configured to be movable closer to or further away from the other camera so that the distance between the second and third cameras 121b and 121c can be adjusted.

A flash 125 and a mirror may be disposed between the second and third cameras 121b and 121c. When an image of a subject is captured by the second and third cameras 121b and 121c, the flash 125 may illuminate the subject. The mirror may allow the user to see him- or herself when he or she wants to capture his or her own image.

Another audio output module (not shown) may be additionally provided on the rear case 100-2. The audio output module on the rear case 100-2 may realize a stereo function along with the audio output module 153 on the front case 100-1. The audio output module on the rear case 100-2 may also be used in a speaker-phone mode.

The interface unit 170 may used as a passage allowing the mobile terminal 100 to exchange data with an external device either through a fixed line or wirelessly.

A broadcast signal reception antenna may be disposed at one side of the front or rear case 100-1 or 100-2, in addition to an antenna used for call communication. The broadcast signal reception antenna may be installed such that it can be extended from the front or rear case 100-1 or 100-2.

The power supply unit 190 may be mounted on the rear case 100-2 and may supply power to the mobile terminal 100. The power supply unit 190 may be, for example, a chargeable battery which can be detachably combined to the rear case 100-2 for being charged.

The mobile terminal 100 may create a stereoscopic 3D image using the second and third cameras 121b and 121c at the rear thereof, and may then display stereoscopic 3D image on the display module 151.

The mobile terminal 100 may display objects corresponding to stereoscopic 3D images differently from objects corresponding to 2D images so that the objects corresponding to stereoscopic 3D images can be easily distinguished from the objects corresponding to 2D images. The mobile terminal 100 may rearrange and display only the objects corresponding to stereoscopic 3D images on the display module 151.

Stereoscopic 3D images are images that can create the illusion of depth in an image and can thus provide viewers with a vivid sense of reality. The two eyes are about 65 mm apart from each other. Thus, when each of the two eyes is presented with different 2D images of the world, the 2D images are projected onto the retinas of the two eyes, and the brain extracts depth from the 2D retinal images using binocular disparity, which results from the horizontal separation of the two eyes and is one of the most important factors that should be considered when designing a 3D display device.

There are various methods of displaying a 3D image such as a stereoscopic display method, which is a method of displaying a 3D image with the use of glasses, an auto-stereoscopic display method, which is a method of displaying a 3D image without the use of glasses and is also called glasses-free 3D, and a projection method, which uses holography. The stereoscopic display method is generally used in home TV sets, and the auto-stereoscopic display method is generally used in mobile terminals.

Examples of the auto-stereoscopic display method include, but are not limited to a lenticular display method, a parallax barrier method and a parallax illumination method. The lenticular display method involves using a sheet of hemispherical lenticular lenses to the front of a device that displays left- and right-eye images. The parallax barrier display method involves projecting left- and right-eye images through a parallax barrier. The parallax illumination method involves placing an illumination plate behind an LCD so as to make alternate columns of pixels visible to the left and right eyes. Research is being conducted on various stereoscopic 3D imaging technique, other than those set forth herein, using several factors that can create the sense of three-dimensionality.

Figure 4:
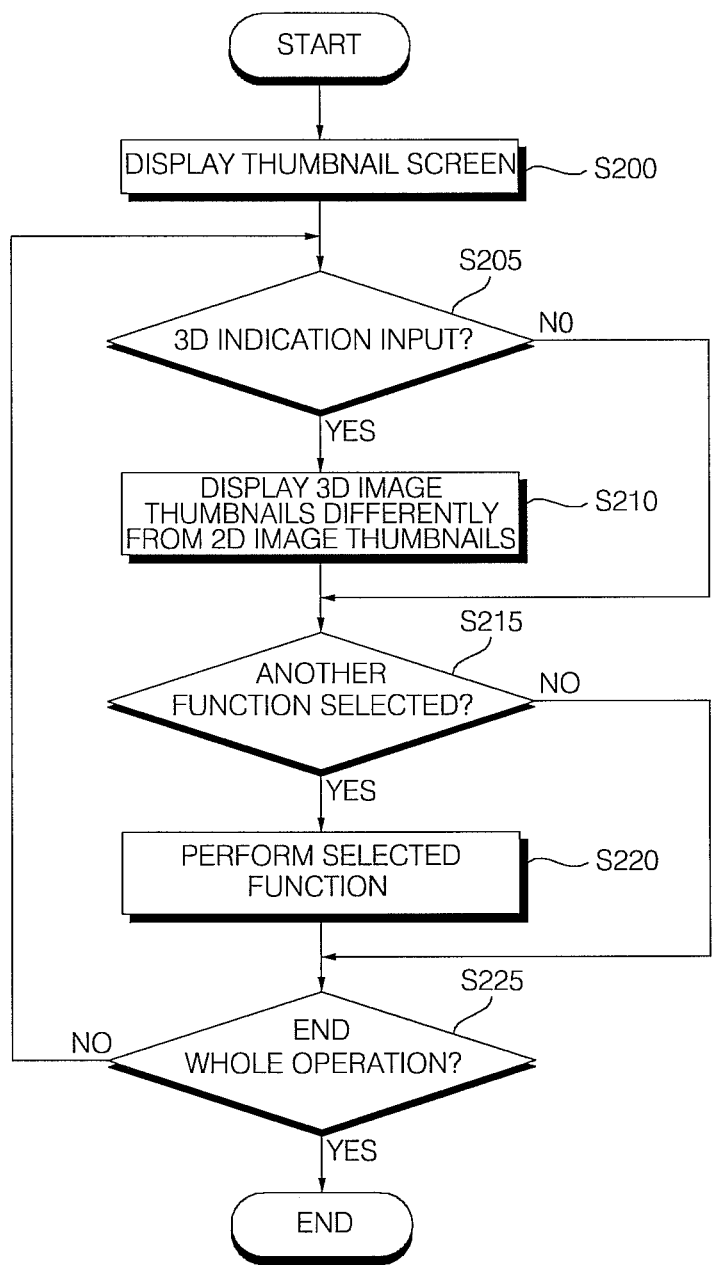
FIG. 4 is a flowchart illustrating an operation control method of a mobile terminal, according to an exemplary embodiment of the present invention.

FIG. 4 illustrates a flowchart illustrating an operation control method of a mobile terminal, according to an exemplary embodiment of the present invention. Referring to FIG. 4, the controller 180 displays a thumbnail screen showing 3D image thumbnails, which are the thumbnails of stereoscopic 3D images, and 2D image thumbnails, which are the thumbnails of 2D images, on the display module 151 in response to the selection of a menu involving the display of stereoscopic images and 2D images, such as a camera album menu or a multimedia file player menu or the receipt of a predefined user command (S200). Thumbnails are reduced-size versions of images and can facilitate the search of still or moving images.

Thereafter, if a 3D indication input for distinguishing the 3D image thumbnails from the 2D image thumbnails is received (S205), the controller 180 displays the 3D image thumbnails differently from the 2D image thumbnails (S210) so that the 3D image thumbnails can be distinguished from the 2D image thumbnails. For example, the 3D image thumbnails may rotate or tilt by a predetermined angle, may be marked with identification symbols, or may shake. In a mode for displaying stereoscopic 3D images, the 3D image thumbnails may be displayed three-dimensionally or in a different depth from the 2D image thumbnails.

The 3D indication input may be generated by manipulating a predefined 3D hot key or pressing a particular part of the thumbnail screen or an icon on the thumbnail screen.

If a function other than displaying thumbnails and/or their respective images is selected (S215), the controller 180 controls the selected function to be performed (S220).

Operations S205 through S220 are repeatedly performed until a user chooses to finish the above-mentioned operation (S225).

According to this exemplary embodiment, it is possible to display 3D image thumbnails differently from 2D image thumbnails. Thus, it is possible for a user to easily determine whether an image represented by a given thumbnail is a stereoscopic 3D image or a 2D image.

Figure 5:
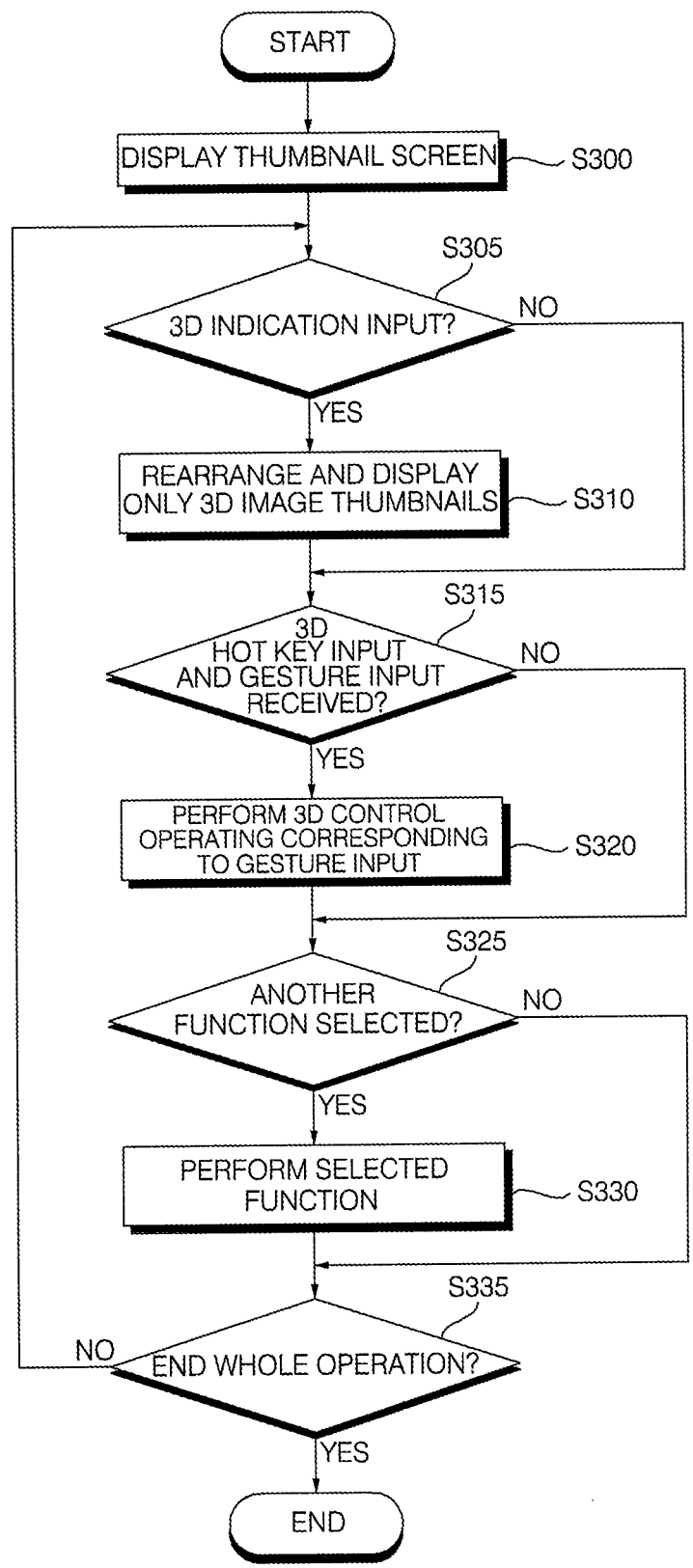
FIG. 5 is a flowchart illustrating an operation control method of a mobile terminal, according to another exemplary embodiment of the present invention.

FIG. 5 illustrates a flowchart of an operation control method of a mobile terminal, according to another exemplary embodiment of the present invention. Referring to FIG. 5, the controller 180 displays a thumbnail screen showing 3D image thumbnails and 2D image thumbnails on the display module 151 in response to the selection of a 3D-related menu or the receipt of a predefined user command (S300).

Thereafter, if a 3D hot key for rearranging and displaying only the 3D image thumbnails is entered (S305), the controller 180 rearranges and displays the 3D image thumbnails on the display module 151 (S310). That is, the 2D image thumbnails are no longer displayed on the display module 151, and only the 3D image thumbnails are displayed on the display module 151.

Thereafter, if a predefined gesture input is received when the 3D hot key is entered (S315), the controller 180 controls a 3D control operation corresponding to the received gesture input to be performed (S320).

The predefined gesture input may be a touch-and-drag detected from the display module 151 with a predefined drag path. Examples of the 3D control operation include adjusting the depth of a stereoscopic 3D image in response to a multi-touch input when the 3D hot key is entered and moving between layers with different depths in response to a flick input. An additional menu for setting what type of 3D control operation should be performed in response to the predefined gesture input may be provided.

If a function other than displaying thumbnails and/or their respective images is selected (S325), the controller 180 controls the selected function to be performed (S330).

Operations S305 through S330 are repeatedly performed until a user chooses to finish the above-mentioned operation (S335).

According to this exemplary embodiment, it is possible to rearrange and display only 3D image thumbnails and to perform various 3D control operations in response to a predefined gesture input.

The exemplary embodiments of FIGS. 4 and 5 have been described, taking a thumbnail screen as an example. However, the present invention is not restricted to a thumbnail screen. That is, the present invention can be applied to a display screen showing both icons, symbols, and/or images representing stereoscopic 3D content items or menus and icons, symbols, and/or images representing 2D content items or menus.

The exemplary embodiments of FIGS. 4 and 5 will hereinafter be described in further detail with reference to FIGS. 6 through 11.

Figure 6:
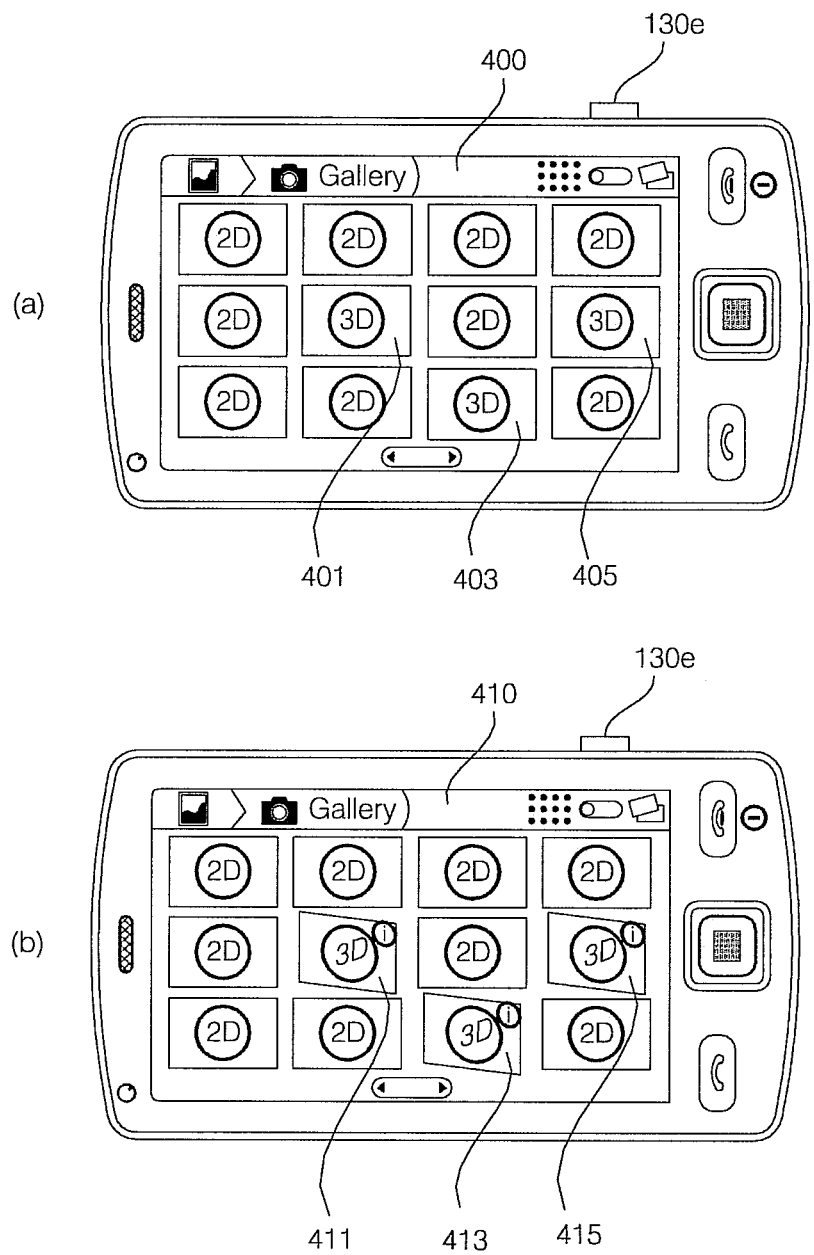
FIGS. 6 through 11 are diagrams for explaining the exemplary embodiments of FIGS. 4 and 5.

Referring to FIG. 6(*a*), not only 2D image thumbnails but also 3D image thumbnails 401, 403, and 405 may be displayed on a thumbnail screen 400.

In this case, if the fifth user input module 130*e* is pressed or a 3D indication input is received when the thumbnail screen 400 is displayed, a thumbnail screen 410 showing thumbnails 411, 413, and 415 of stereoscopic 3D images may be displayed, as shown in FIG. 6(*b*). The 3D image thumbnails 411, 413, and 415, unlike the 3D image thumbnails 401, 403, and 405, are marked with an identification symbol, and are slightly rotated in one direction.

Since the 3D image thumbnails 411, 413, and 415 are displayed to be distinguishable from 2D image thumbnails, it is possible for a user to easily determine whether an image represented by a given thumbnail is a stereoscopic 3D image or a 2D image.

Figure 7:
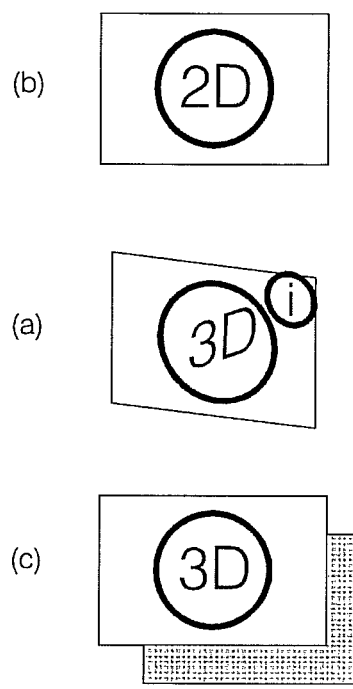

FIG. 7(*a*) illustrates an example of an 2D image thumbnail, and FIGS. 7(*b*) and 7(*c*) illustrate examples of a 3D image thumbnail. Referring to FIG. 7(*b*), a 3D image thumbnail may be slightly rotated. Alternatively, referring to FIG. 7(*c*), a 3D image thumbnail may be displayed three-dimensionally. Still alternatively, a 3D image thumbnail may be tilted or may shake. Still alternatively, the thumbnails of left- and right-eye images of a 3D image may be alternately displayed as a 3D image thumbnail.

In short, 3D image thumbnails may be displayed in various shapes according to the operating mode of the mobile terminal 100 and may thus be able to be distinguished from 2D image thumbnails.

Figure 8:
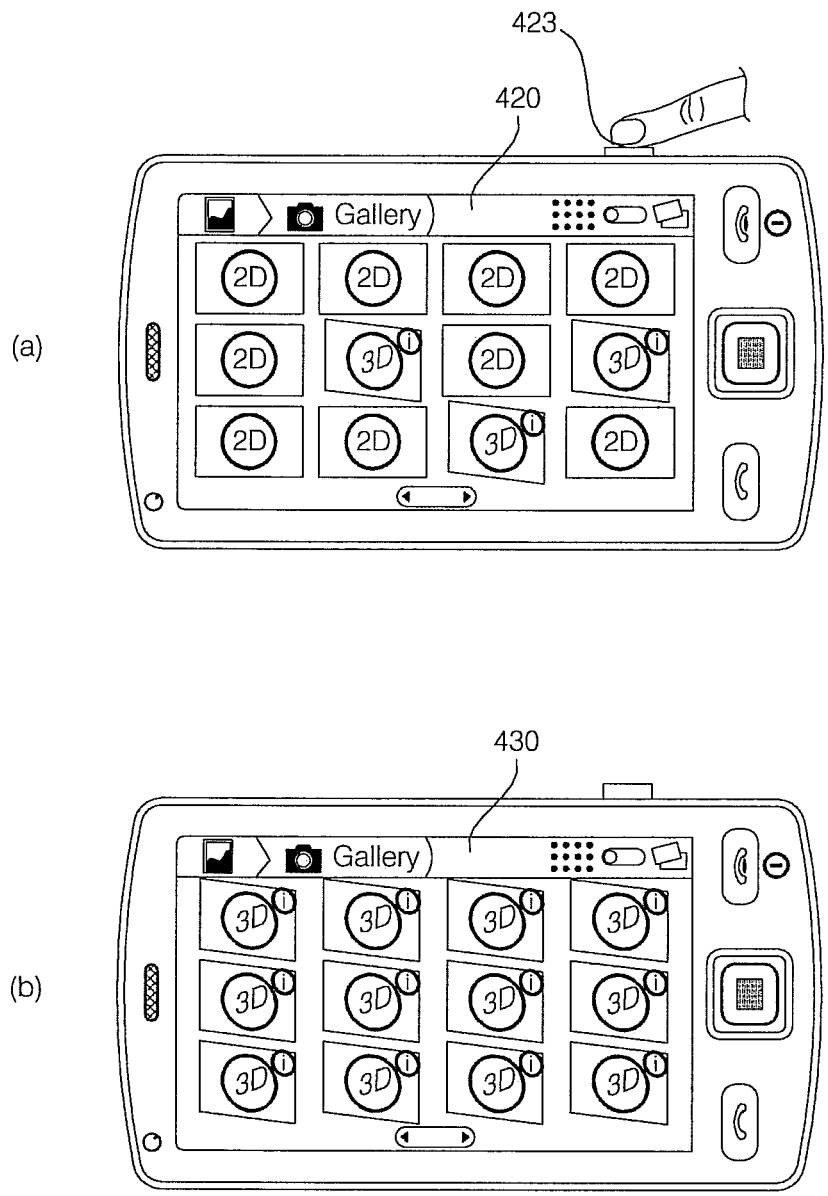

Referring to FIGS. 8(*a*) and 8(*b*), if the fifth user input module 130*e*, which is set as a 3D hot key, is pressed when a thumbnail screen 420 showing a plurality of thumbnails is displayed, a thumbnail screen 430 showing only 3D image thumbnails may be displayed.

Figure 9:
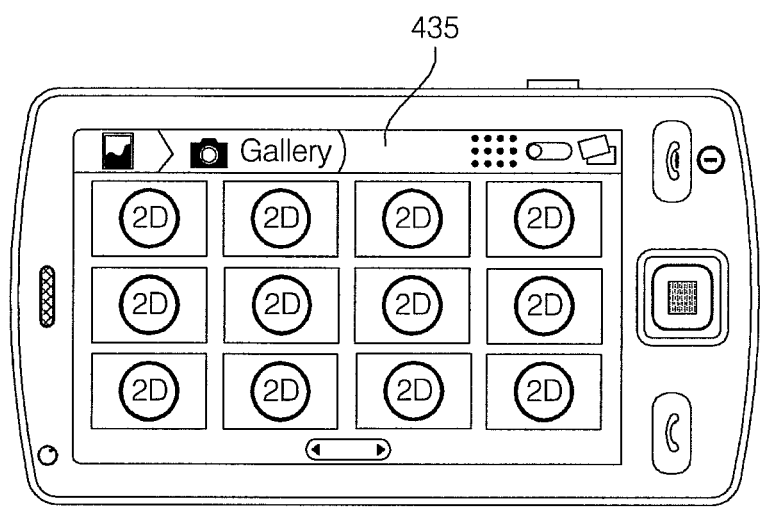

If the 3D hot key is pressed when the thumbnail screen 430 is displayed, a thumbnail screen 435 showing only 2D image thumbnails may be displayed, as shown in FIG. 9.

Figure 10:
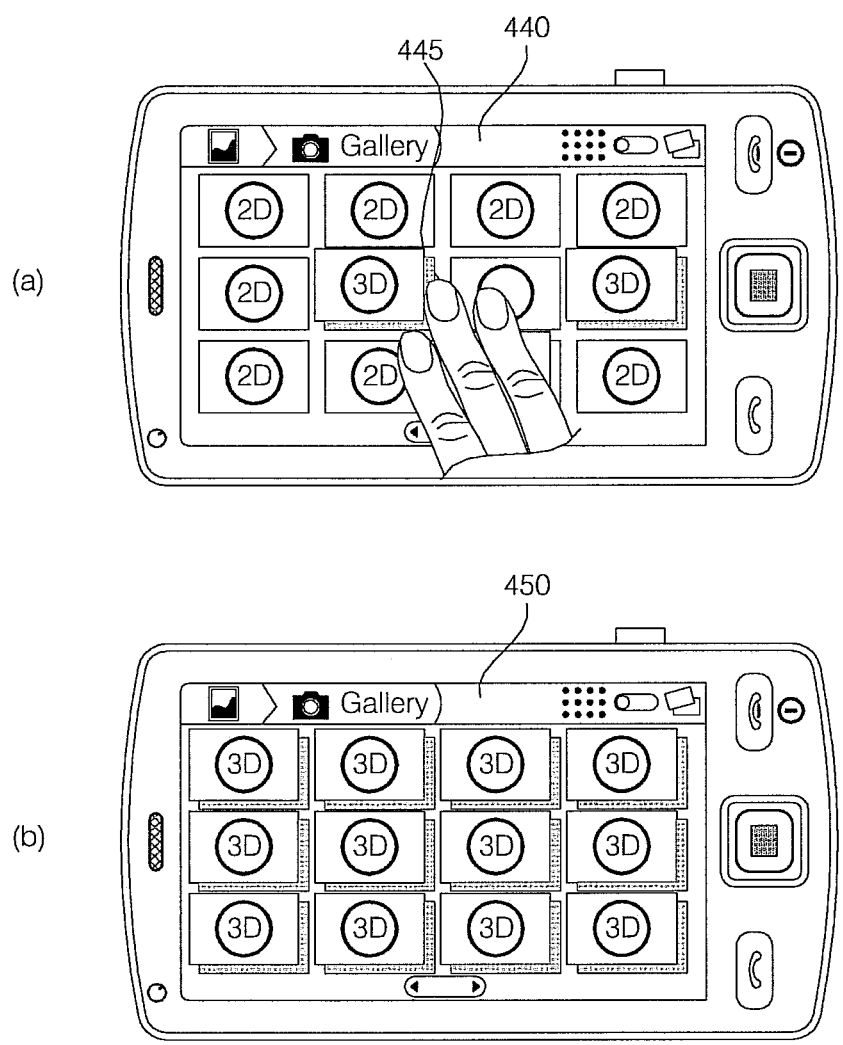

Referring to FIGS. 10(*a*) and 10(*b*), if a user multi-touches on a thumbnail screen 440 with three fingers, as indicated by reference numeral 445 when a multi-touch input is set as a 3D hot key input, a thumbnail screen 450 having only 3D image thumbnails may be displayed. The 3D image thumbnails on the thumbnail screen 450 may be displayed three-dimensionally. Similarly, a thumbnail screen showing only 2D image thumbnails may be configured to be displayed in response to a predefined user input.

Figure 11:
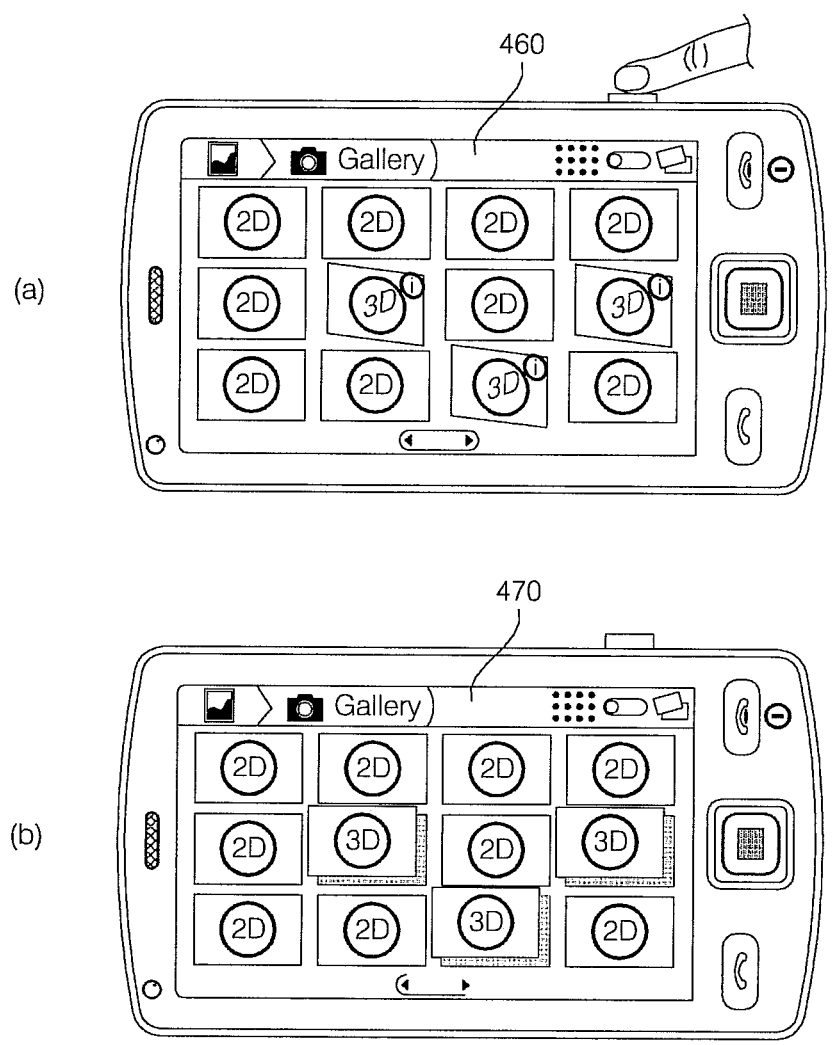

Referring to FIGS. 11(*a*) and 11(*b*), if the fifth user input module 130*e*, which is set as a mode switch key, is pressed when a thumbnail screen 460 having a plurality of thumbnails displayed thereon two-dimensionally is displayed, a thumbnail screen 470 having 2D image thumbnails and 3D image thumbnails displayed thereon in different depths may be displayed.

Objects corresponding to stereoscopic 3D images may be displayed to be distinguishable from objects corresponding to 2D images in various manners, other than those set forth herein.

The mobile terminal according to the present invention and the method of controlling the operation of the mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to display objects (such as thumbnails or icons) corresponding to stereoscopic 3D images to be distinguishable from objects corresponding to 2D images or to rearrange and then display only the objects corresponding to stereoscopic 3D images. Therefore, it is possible for a user to instantly determine whether an image represented by a given object is a stereoscopic 3D image or a 2D image.

While the present invention has been particularly shown and described with reference to exemplary embodiments thereof, it will be understood by those of ordinary skill in the art that various changes in form and details may be made therein without departing from the spirit and scope of the present invention as defined by the following claims.

The present invention provides a mobile terminal capable of displaying objects corresponding to stereoscopic three-dimensional (3D) images differently from objects corresponding to two-dimensional (2D) images so that the objects corresponding to stereoscopic 3D images can be easily distinguished from the objects corresponding to 2D images and an operation control method of the mobile terminal.

According to an aspect of the present invention, there is provided an operation control method of a mobile terminal, the operation control method including displaying a display screen including a first group of objects corresponding stereoscopic three-dimensional (3D) images and a second group of objects corresponding two-dimensional (2D) images on a display module; receiving a indication input for distinguishing the first group of objects from the second group of objects; and displaying the first group of objects differently from the second group of objects in response to the received 3D indication input so that the first group of objects can be distinguished from the second group of objects.

According to another aspect of the present invention, there is provided a mobile terminal including a display module configured to display thereon a display screen including a first group of objects corresponding stereoscopic 3D images and a second group of objects corresponding 2D images; and a controller configured to display the first group of objects differently from the second group of objects in response to a 3D indication input for distinguishing the first group of objects from the second group of objects so that the first group of objects can be distinguished from the second group of objects.

According to another aspect of the present invention, there is provided an operation control method of a mobile terminal, the operation control method including displaying a display screen including a first group of objects corresponding stereoscopic 3D images and a second group of objects corresponding 2D images on a display module; receiving an input for displaying the first group of objects; and rearranging and displaying only objects corresponding to stereoscopic 3D images that suit a current operating mode on the display module.

According to another aspect of the present invention, there is provided a mobile terminal including a display module configured to display thereon a display screen including a first group of objects corresponding stereoscopic 3D images and a second group of objects corresponding 2D images; and a controller configured to rearrange and display only objects corresponding to stereoscopic 3D images that suit a current operating mode on the display module in response to an input for displaying the first group of objects.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of a mobile terminal, the method comprising:
   displaying, on a display, a first group of objects and a second group of objects in a same manner, the first group of objects corresponding to perceived three-dimensional (3D) images and the second group of objects corresponding to two-dimensional (2D) images;
   receiving a first input to distinguish the first group of objects;
   in response to receiving the first input, changing the display of the first group of objects in a predetermined manner according to an operating mode of the mobile terminal such that the first group of objects is distinguished from the second group of objects;
   receiving a second input to arrange the first and second group of objects;
   exclusively displaying, on the display, the first group of objects without displaying the second group of objects in response to receiving the second input;
   replacing a first screen including exclusively the first group of objects with a second screen including exclusively the second group of objects in response to further receiving the second input;
   performing 3D control operation in response to receiving the second input and a predefined gesture input, wherein the 3D control operation corresponds to the predefined gesture input; and
   providing a menu for setting 3D control operation to be performed in response to the predefined gesture input.

2. The method of claim 1, wherein the first group of objects and the second group of objects each separately comprise thumbnails, icons, or symbols.

3. The method of claim 1, wherein changing the display of the first group of objects comprises at least one of rotating the displayed first group of objects, tilting the displayed first group of objects, applying an animation effect to the displayed first group of objects, or providing an identification symbol to the displayed first group of objects when the operating mode of the mobile terminal is a mode for displaying 2D images.

4. The method of claim 1, wherein changing the display of the first group of objects includes alternately displaying left- and right-images corresponding to each of the first group of objects when the operating mode of the mobile terminal is a mode for displaying 2D images.

5. The method of claim 1, wherein receiving the first input comprises receiving a 3D key input, receiving a touch on a predefined part of the display or receiving a touch on an icon displayed on the display.

6. The method of claim 1, wherein the perceived 3D image is a stereoscopic 3D image.

7. The method of claim 1, wherein changing the display of the first group of objects comprises displaying the first group of objects three-dimensionally when the operating mode of the mobile terminal is a mode for displaying stereoscopic 3D images.

8. The method of claim 1, further comprising:
   receiving a predefined gesture input; and
   performing a 3D control operation in response to receiving the predefined gesture input.

9. The method of claim 8, wherein the predefined gesture input is a touch-and-drag detected by the display.

10. The method of claim 8, wherein performing the 3D control operation includes adjusting a perceived depth of the first group of objects.

11. The method of claim 1, wherein receiving the second input includes receiving a multi-touch on the display.

12. A mobile terminal comprising:
    a display configured to display a first group of objects and a second group of objects in a same manner, the first group of objects corresponding to perceived three-dimensional (3D) images and the second group of objects corresponding to two-dimensional (2D) images; and
    a controller configured to:
      change the display of the first group of objects in a predetermined manner according to an operating mode of the mobile terminal in response to the mobile terminal receiving a first input to distinguish the first group of objects, wherein the changed display includes the first group of objects corresponding to the perceived 3D images being distinguished from the second group of objects,
      exclusively display, on the display, the first group of objects without displaying the second group of objects in response to the mobile terminal receiving a second input to arrange the first and second group of objects,
      replace a first screen including exclusively the first group of objects with a second screen including exclusively the second group of objects in response to further receiving the second input,
      perform 3D control operation in response to the second input and a predefined gesture input, wherein the 3D control operation corresponds to the predefined gesture input, and
      provide a menu for setting 3D control operation to be performed in response to the predefined gesture input.

13. The mobile terminal of claim 12, wherein the first group of objects and the second group of objects each separately comprise thumbnails, icons, or symbols.

14. The mobile terminal of claim 12, wherein the controller changes the display of the first group of objects by at least one of rotating the displayed first group of objects, tilting the displayed first group of objects, applying an animation effect to the displayed first group of objects, or providing an identification symbol to the displayed first group of objects when the operating mode of the mobile terminal is a mode for displaying 2D images.

15. The mobile terminal of claim 12, wherein the controller changes the display of the first group of objects by alternately displaying left- and right-images corresponding to each of the first group of objects.

16. The mobile terminal of claim 12, wherein the perceived 3D image is a stereoscopic 3D image.

17. The mobile terminal of claim 12, further comprising a 3D key to provide the first input to distinguish the first group of objects.

18. The mobile terminal of claim 12, wherein the controller changes the display of the first group of objects by displaying the first group of objects three-dimensionally when the operating mode of the mobile terminal is a mode for displaying stereoscopic 3D images.

19. The mobile terminal of claim 12, wherein performing the 3D control operation includes adjusting a perceived depth of the first group of objects.

20. A mobile terminal comprising:
a display configured to display a first group of thumbnails and a second group of thumbnails in a same manner, the first group of thumbnails corresponding to stereoscopic three-dimensional (3D) thumbnails, the second group of thumbnails corresponding to two-dimensional (2D) thumbnails; and
a controller configured to:
change the display of the first group of thumbnails in a predetermined manner according to an operating mode of the mobile terminal in response to the mobile terminal receiving a first input to distinguish the first group of thumbnails, wherein the changed display includes the first group of thumbnails being distinguished from the second group of thumbnails by rotating the displayed first group of thumbnails, applying an animation effect to the displayed first group of thumbnails, providing the identification symbol to the displayed first group of thumbnails or displaying only the first group of thumbnails without displaying the second group of thumbnails,
exclusively display, on the display, the first group of thumbnails without displaying the second group of thumbnails in response to the mobile terminal receiving a second input to arrange the first and second group of thumbnails,
replace a first screen including exclusively the first group of objects with a second screen including exclusively the second group of objects in response to further receiving the second input,
perform 3D control operation in response to the second input and a predefined gesture input, wherein the 3D control operation corresponds to the predefined gesture input, and
provide a menu for setting 3D control operation to be performed in response to the predefined gesture input.

21. The mobile terminal of claim 20, wherein the 3D control operation includes adjusting a perceived depth of the first group of thumbnails.

* * * * *